United States Patent [19]

Weber

[11] Patent Number: 4,754,542
[45] Date of Patent: Jul. 5, 1988

[54] PROCESS OF FABRICATING SPAR-TYPE CONSUMABLE ELECTRODE FOR VACUUM ARC MELTING OF ZIRCONIUM OR TITAN ALLOYS WITH WEDGED-ON SEGMENT

[75] Inventor: Sylvester A. Weber, Pleasant View, Utah

[73] Assignee: Westinghouse Electric Corp., Pittsburgh, Pa.

[21] Appl. No.: 10,513

[22] Filed: Jan. 30, 1987

[51] Int. Cl.⁴ .............................................. B23P 19/02
[52] U.S. Cl. .................................. 29/525; 219/146.1; 373/67; 373/8; 403/350; 403/374; 445/46
[58] Field of Search ...................... 29/525; 219/146.1; 373/67, 68, 88; 445/46; 403/350, 351, 352, 374, 383, 409.1

[56] References Cited

U.S. PATENT DOCUMENTS

| | | |
|---|---|---|
| 1,088,296 | 2/1914 | Richards . |
| 2,043,855 | 6/1936 | Keller . |
| 2,107,835 | 2/1938 | Pierce ............................ 403/374 X |
| 2,284,847 | 6/1942 | Raymond ........................... 403/350 |
| 2,319,977 | 5/1943 | Cape et al. . |
| 2,397,382 | 3/1946 | Smith ............................... 403/350 |
| 2,479,698 | 8/1949 | Paquin ........................... 403/350 X |
| 2,765,136 | 10/1956 | Knapp ............................ 403/374 X |
| 2,825,101 | 3/1958 | Rubenstein ..................... 403/374 X |
| 2,973,428 | 2/1961 | Pfieffer . |
| 3,030,706 | 4/1962 | Griffiths . |
| 3,400,206 | 9/1968 | Barth . |
| 3,438,660 | 4/1969 | Steiner ............................ 403/374 X |
| 3,565,602 | 2/1971 | Kenisi et al. . |
| 3,850,226 | 11/1974 | Cadden et al. ................... 373/67 X |
| 4,200,492 | 4/1980 | Armijo . . |
| 4,304,953 | 12/1981 | Machner et al. ..................... 373/67 |
| 4,513,425 | 4/1985 | Karagoz et al. ..................... 373/88 |
| 4,539,688 | 9/1985 | Weber . |

FOREIGN PATENT DOCUMENTS

| | | |
|---|---|---|
| 1110340 | 4/1962 | Fed. Rep. of Germany . |
| 1338255 | 11/1973 | United Kingdom ............... 403/350 |
| 1438212 | 6/1976 | United Kingdom ............... 403/350 |
| 642365 | 7/1977 | U.S.S.R. . |

Primary Examiner—Charlie T. Moon
Attorney, Agent, or Firm—R. A. Stoltz

[57] ABSTRACT

This is an improved electrode for consumable vacuum arc melting of zirconium and titanium alloys, for alloys containing a low melting point alloying material or for very low oxygen zirconium. Electrodes of this type use a low resistance spar extending substantiallly the length of the electrode, with this spar being substantially free of any unalloyed low melting point material. The improvement utilizes attachment by wedging of the external members to the spar core. Preferably the wedging is accomplished by rotation of the external member with respect to the spar core.

6 Claims, 2 Drawing Sheets

PROCESS OF FABRICATING SPAR-TYPE CONSUMABLE ELECTRODE FOR VACUUM ARC MELTING OF ZIRCONIUM OR TITAN ALLOYS WITH WEDGED-ON SEGMENT

BACKGROUND OF THE INVENTION

Providing homogeneous alloys of high temperature reactive metals such as zirconium and titanium has presented problems. U.S. Pat. No. 3,565,602 issued to Konisi et al. on Feb. 23, 1971 discusses the problem of adding constituents with different melting points and includes several prior art methods of dealing with these problems. The greater the temperature difference of melting points, the more difficult these problems become. Tin, which is commonly added as an alloying constituent of zirconium alloys, is an example of a low melting point material, the introduction of which presents significant difficulties. While alloying materials are often added using master alloys, such master alloys of the zirconium and titanium have a tendency to be pyrophoric and are prone to contribute undesirable phases such as nitrides to the alloys. Further, the master alloy is still relatively low melting and the resistance heating of the electrode tends to melt the master alloy away from the arc, resulting in an inhomogeneous product. To control the amount of tin during arc melting it is common practice to contain the unalloyed tin within a tight packet of some form within the electrode.

Attempts have also been made to reduce the electrode resistance to minimize resistance heating of the electrode during melting by, for example, providing multiple welding beads longitudinally along the electrode, however, such techniques are time consuming and have not proven totally affective. U.S. Pat. No. 3,404,206, to Barth provides for the welding of a low electrical resistance metallic strip along substantially the entire length of the electrode to avoid excessive resistance-heating of the electrode and, in particular, to provide stability against warpage of the electrode during use.

U.S. Pat. No. 4,539,688, issued to Weber on Sept. 3, 1985 provides an electrode for consumable arc melting of zirconium and titanium alloys, which alloys contain a low melting point constituent. The electrode uses a low resistance spar extending substantially the length of the electrode, with the spar being substantially free of any unalloyed low melting point alloy constituent. External members containing unalloyed low melting point constituents are attached to the spar member. Generally, this patent utilizes welding of the external members to the spar (the patent/notes, however, that external members can be mechanically attached by methods other than the welding) and commercial usage of spars with welded-on segments has proven highly successful.

SUMMARY OF THE INVENTION

It has been discovered that the welding of external members to spar core is both somewhat time consuming (such welding generally has to be performed under vacuum, by, for example, electron beam welding) and that such welding can raise the oxygen level in the product to an undesirable level (moisture, which might otherwise be removed by heating prior to melting, reacts with zirconium or titanium during welding to produce an oxide which is extremely difficult to remove). Oxygen level is occasionally a problem in Zircaloy and always important in zirconium material used for lining fuel elements as described, for example, in U.S. Pat. No. 4,200,492 issued to Armijo on Apr. 29, 1980.

This invention is of an improved electrode generally of the type described in the afore-mentioned Weber patent, in which the external members are wedged onto the spar core. An opening is formed in the external member, which opening is shaped to permit passage of the spar core through the opening with one relative position, but providing for a wedged relationship between the external member and the core. After the spar core is passed through the opening, the external member is wedged to the spar core, thereby assembling the electrode without welding of the external member to the spar core. Preferably the spar core is generally rectangular (as used herein, "rectangular" includes shapes with a square cross-section) in shape and preferably multiple external members are wedged on a single spar core. The invention can also use an elliptical cross-section spar core and an elliptical hole in the external member.

BRIEF DESCRIPTION OF THE DRAWINGS

This invention can be best understood by reference to the following drawings, in which.

DESCRIPTION OF THE PREFERRED EMBODIMENTS

This invention provides a process for producing a spar-type consumable electrode for vacuum arc melting of zirconium or titanium alloys with the improvement providing for wedging attachment of external members to the spar core.

As used herein, the term "unalloyed low melting point alloying material" is used to mean an alloying material with a melting point of at least 1000° F. lower than the melting point of the zirconium or titanium which is the principle constituent of the alloy, and preferably a single element (such as tin), but possibly a low melting master alloy.

Figure 1:
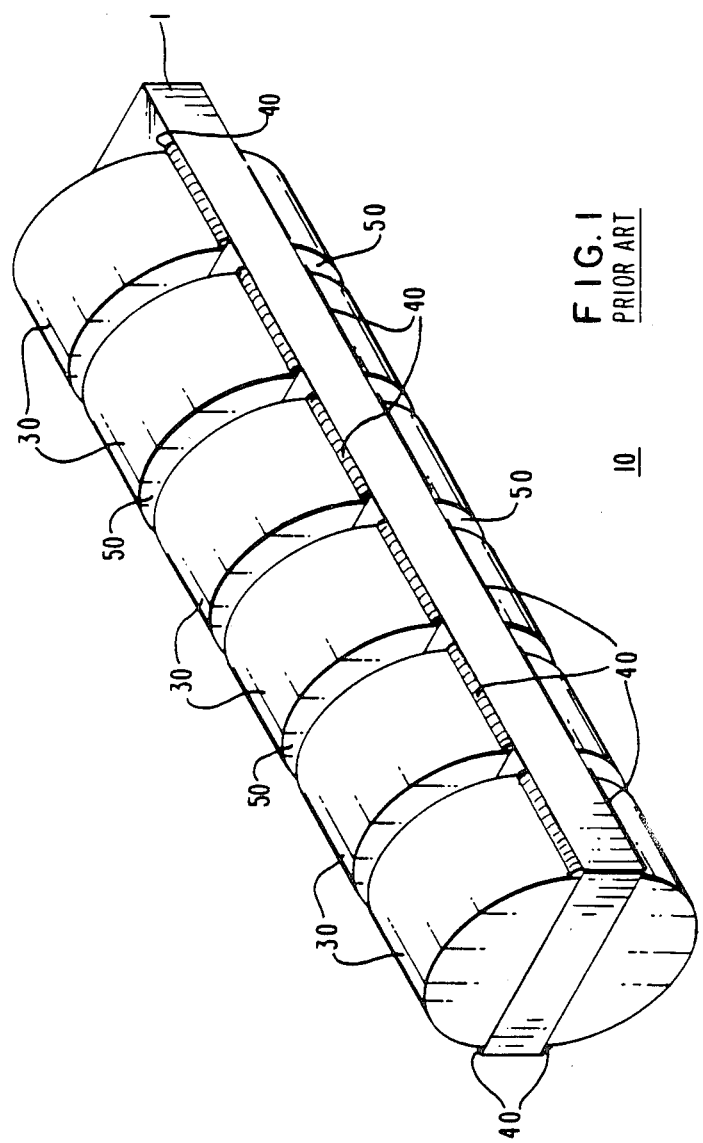
FIG. 1 shows a prior art spar-type consumable electrode (of the afore-mentioned Weber patent, which patent is hereby incorporated by reference), and in which an example is shown with the external members being attached to the spar by welding.
Figure 2A:
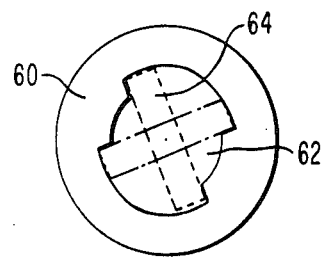
FIG. 2 shows three examples of external members of this invention which are attachable to a spar cores by rotation.
Figure 2B:
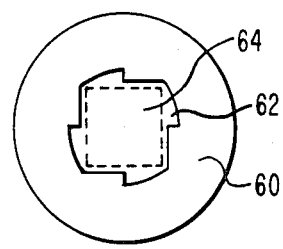
Figure 2C:
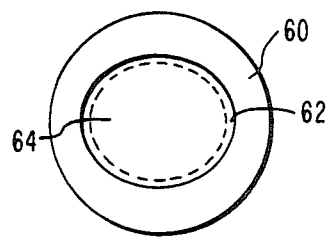

FIG. 1 shows the prior art electrode generally as used commercially, and which is an example of the electrode of the aforementioned Weber patent. The spar 1 was generally fabricated by rolling or forging and had a general rectangular slab configuration as illustrated (eg. into a 3-inch by 14-inch rectangular cross section and a length of approximately 200 inches). Half-moon-shaped segments 30 (cylindrical sections cut into along the axis) were prepared, for example, by pressing zirconium granules (possibly also containing scrap) and also contained packets of the unalloyed low melting point alloying material. These segments were shown welded 40 on either side of the spar 1 and spaced along the length of the electrode 10, generally providing gaps 50 between adjacent segments In example this invention as shown in FIG. 2, the external member 60 has an opening 62 through which a spar core can be inserted. Spar cores having dimensions of 2-7 inch by 6-20 inch by up to 300 inches in length can, for example, be used. Similarly, the spar core can have a 6½ by 6½ inch or 12 by 12 inch cross-section or a near-circular elliptical cross-section (preferably of about 30-100 square inches in area). The opening is being shaped to allow passage of the spar core in an initial relative position of external member and spar core, but provides a wedging relationship between the external member 60 and the spar core when the external member 60 of this example is rotated to a second relative position with respect to the spar core. Thus the attaching of the external member 62 to the spar core can be accomplished without welding. In FIG. 2 the relative position of a rectangular spar core which allows the spar core to pass through the opening is shown by dotted lines 64 and the position of the spar core with a wedging relationship is shown by dot-dash lines 66 in FIG. 2A.

Figure 3:
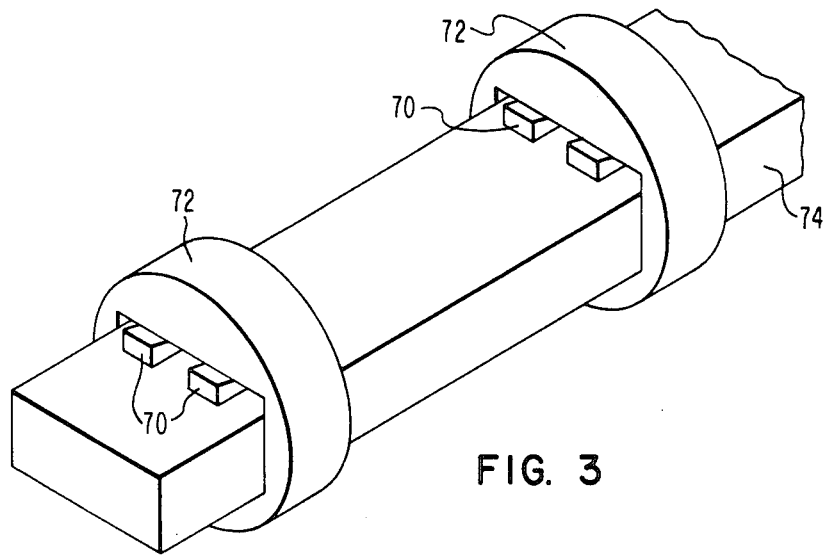
FIG. 3 shows the attaching of external members to a spar core utilizing an additional wedging member inserted between the external member and the spar core.

FIG. 3 shows an alternate embodiment of this invention in which one or more additional wedging member 70 is utilized to wedge the external member 72 to the spar core 74. This embodiment provides a somewhat simpler configuration of the external member and thus simplifies the dies used to press such external members. It does, however, require fabricating and handling of additional wedging members. The wedging members can either be free of unalloyed low melting point alloying material, or can contain such low melting point alloying material.

When used to make low-oxygen liner material no alloying material is used, and thus premature melting of such alloying material is, of course, not a problem in such applications. A spar using wedged-on external members is still very important in such applications, as it eliminates welding during electrode fabrication and thus lowers the oxygen content of the liner in the final product.

The invention is not to be construed as limited to the particular examples described herein, as these are to be regarded as illustrative rather than restrictive. The invention is intended to cover all processes which do not depart from the spirit and scope of the invention.

I claim:

1. In combination with a process for fabricating a consumable electrode for use in the arc melting of an alloy having Zr or Ti as its principal constituent and which is to contain a low melting alloying material which melts at least 1000° F. below said principal constituent, said electrode being of the type having a low resistance spar core which is substantially free of said unalloyed low melting material extending substantially the length of said electrode, and at least one external member principally comprising compacted granules of Zr or Ti and containing unalloyed low melting alloying material, and attaching said electrode said external member is attached to said spar core, the improvement which comprises:

forming an opening in said external member, said opening being shaped to permit passage of said spar core in an initial relative positioning of external member and spar core, but providing for a wedging relationship between said external member and said spar core;

passing said spar core through said opening; and establishing a wedging relationship between said external member and said spar core, whereby assembling of said electrode is accomplished without welding of the external member to said spar core.

2. The process of claim 1, wherein said opening is formed to provide said wedging relationship directly between said external member and said spar core when said external member is rotated with respect to said spar core.

3. The process of claim 1, wherein said opening is formed to provide said wedging relationship when an additional wedging member is inserted between said external member and said spar core.

4. In combination with a process for fabricating a consumable electrode for use in the arc melting of an alloy having Zr or Ti as its principal constituent and which is to contain a low melting alloying material which melts at least 1000° F. below said principal constituent, said electrode being of the type having a low resistance spar core which is substantially free of said unalloyed low melting material extending substantially the length of said electrode, and at least one external member principally comprising compacted granules of Zr or Ti and containing unalloyed low melting alloying material, and in which said external member is attached to said spar core, the improved method which comprises:

forming a generally rectangular spar core;

forming an opening in said external member, said opening being shaped to permit passage of said rectangular spar core in an initial relative position of external member and spar core, but providing a wedging relationship between said external member and said spar core when said external member is rotated to a second relative position with respect to said spar core;

passing said spar core through said opening; and rotating said external member with respect to said spar core to wedge said external member onto said spar core, whereby the attaching of said external member to said spar core is accomplished without welding.

5. The process of claim 4, wherein multiple external members are attached in a wedging relationship to a single spar core.

6. In combination with a process for fabricating a consumable electrode for use in the arc melting of Zr for use as a fuel element liner, said electrode being of the type having a low resistance spar core extending substantially the length of said electrode, and at least one external member consisting essentially of compacted granules of Zr attached to said spar core, the improvement which comprises:

forming an opening in said external member, said opening being shaped to permit passage of said spar core in an initial relative positioning of external member and spar core, but providing for a wedging relationship between said external member and said spar core;

passing said spar core through said opening; and establishing a wedging relationship between said external member and said spar core, whereby assembling of said electrode is accomplished without welding of the external member to said spar core.

* * * * *